(12) United States Patent
Blatti

(10) Patent No.: US 6,396,690 B1
(45) Date of Patent: May 28, 2002

(54) PCI CARD GUIDE SUPPORT BRACKET

(75) Inventor: Kenneth George Blatti, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,157

(22) Filed: May 13, 1998

(51) Int. Cl.$^7$ ................................................ H05K 7/20
(52) U.S. Cl. ..................... 361/690; 361/695; 361/686; 361/756; 361/802; 439/61; 439/64; 439/631; 211/41.17; 312/223.2
(58) Field of Search ................................. 361/684, 686, 361/690, 695, 756, 802, 704; 439/61, 64, 631; 211/41.17; 312/223.2

(56) References Cited

U.S. PATENT DOCUMENTS 4,519,016 A  *  5/1985  Bradley et al. ............. 361/802
5,210,680 A  *  5/1993  Scheibler ..................... 361/695

* cited by examiner

Primary Examiner—Leo P. Picard
Assistant Examiner—Boris L. Chervinsky
(74) Attorney, Agent, or Firm—Bracewell & Patterson, LLP

(57) ABSTRACT

An electronic computer card guide support bracket is mounted inside a chassis near a ventilation fan. The support bracket has a sheet metal body with sidewalls which extend between a face of the support bracket and the chassis. The sidewalls form ducts for the ventilation fan. The support bracket also has parallel guide members which are integrally formed with the body along its face. Each guide member has upper and lower rails which define a variable width slot between them for receiving a PCI card. The portions of the PCI cards which contact the support bracket are electrically insulated. An electrically insulated guide member is also mounted to the support bracket for receiving an FSIOA card which may not be insulated. An aperture is located between each adjacent pair of the guide members for permitting air flow to circulate around the PCI cards. Each aperture has an area which is larger than a frontal surface area of each guide member.

13 Claims, 3 Drawing Sheets

PCI CARD GUIDE SUPPORT BRACKET

TECHNICAL FIELD

This invention relates in general to computer structural support members and in particular to a PCI card guide support bracket with enhanced air flow capability.

BACKGROUND ART

In one type of computer, the personal computer interface (PCI) cards are located in the lower part of the machine frame and connected to a PCI card guide support bracket on each end. Even with the assistance of the machine's cooling fan, this location is exposed to limited air circulation which makes it difficult to cool the components on the PCI boards during operation. The primary cause for the lack of air circulation is the design of the support bracket. The support bracket is essentially a solid panel with a few slots for retaining the ends of the PCI cards. The slots permit very little airflow, which causes the components on the PCI cards to operate in an excessive temperature environment. In addition, the support bracket is formed from several pieces which must be assembled. A less expensive PCI card support bracket which permits better airflow around the PCI cards is needed.

DISCLOSURE OF THE INVENTION

An electronic computer card guide support bracket is mounted inside a chassis near a ventilation fan. The support bracket has a sheet metal body with sidewalls which extend between a face of the support bracket and the chassis. The sidewalls form ducts for the ventilation fan.

The support bracket also has a plurality of parallel guide members which are integrally formed with the body along its face. Each guide member has upper and lower rails which define a variable width slot between them for receiving a PCI card. The portions of the PCI cards which contact the support bracket are electrically insulated. An electrically insulated guide member is also mounted to the support bracket for receiving an FSIOA card which may not be insulated. An aperture is located between each adjacent pair of the guide members for permitting air flow to circulate around the PCI cards. Each aperture has an area which is larger than a frontal surface area of each guide member.

BEST MODE FOR CARRYING OUT THE INVENTION

Figure 1:
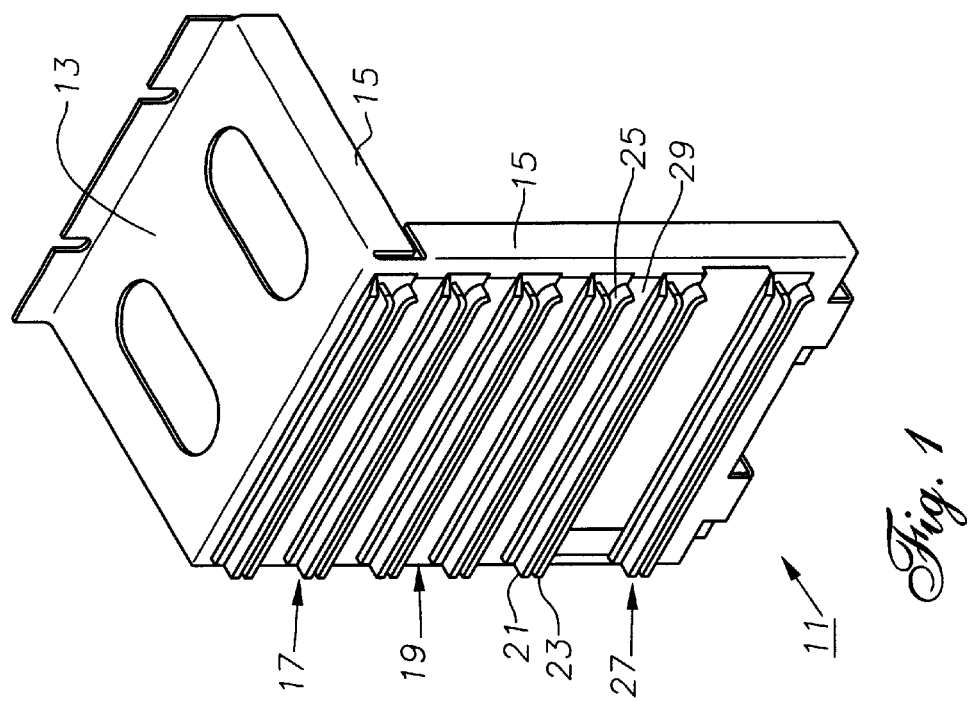
FIG. 1 is an isometric view of a prior art PCI card support bracket.

Referring to FIG. 1, a prior art personal computer card (PCI) guide support bracket 11 is shown. Support bracket 11 has a sheet metal body 13 which is formed into an L-shape and has several short flanges 15 for additional strength. A plurality of parallel, generally rectangular guide members 17 are mounted to a face or vertical portion 19 of support bracket 11 with fasteners (not shown). Each guide member 17 is formed from plastic and has parallel upper and lower rails 21, 23 which define a slot between them. Rails 21, 23 are flared apart on one end to form a receptacle 25 for receiving an electronic card (not shown). Rails 21, 23 are separated by a distance which is slightly larger than a thickness of one of the electronic cards. An additional guide member 27 is located at the bottom of support bracket 11 for receiving and supporting a long PCI card known as a FSIOA card (not shown). Guide member 27 is virtually identical to guide members 17. An open aperture 29 is located between each adjacent pair of guide members 17 for permitting air flow to circulate around the electronic cards. Each aperture 29 has a frontal area which is less than a frontal area of each guide member 17. In one example, apertures 29 provide a 41% open face on vertical portion 19.

Figure 2:
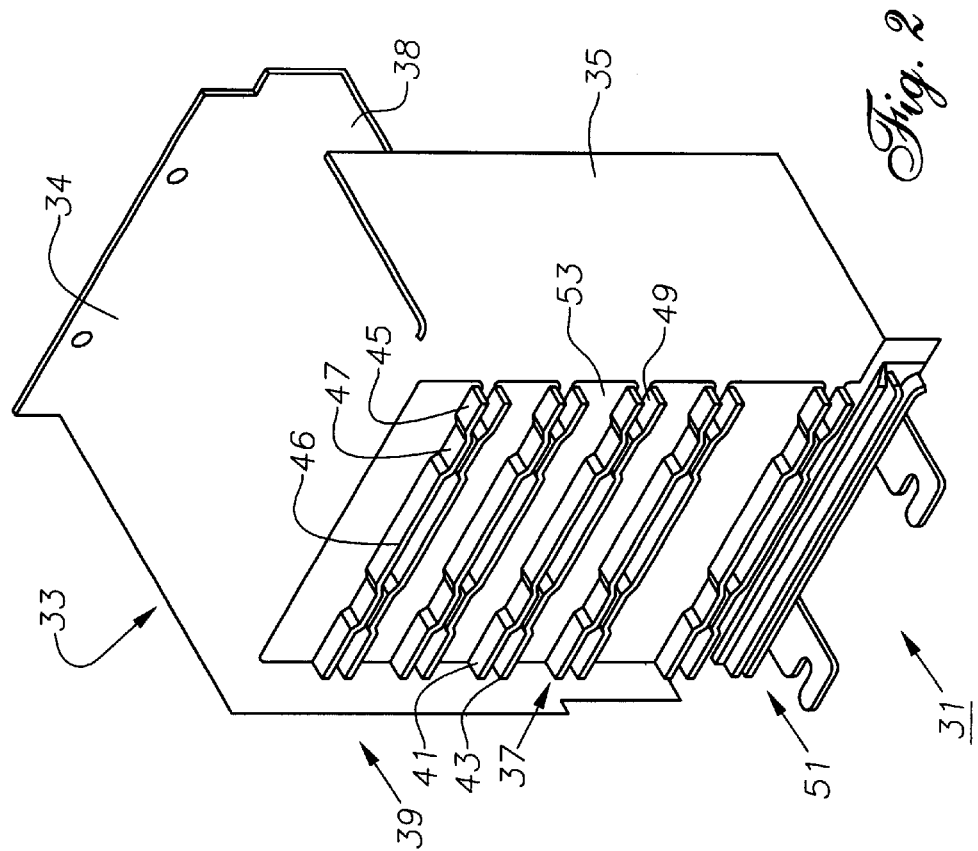
FIG. 2 is an isometric view of a first embodiment of a PCI card support bracket constructed in accordance with the invention.

Referring now to FIG. 2, a first embodiment of a PCI card guide support bracket 31 is shown. Like support bracket 11, support bracket 31 has a sheet metal body 33. Body 33 has a top 34, a front face 39, and a pair of sidewalls 35. A depending flange 38 extends downward for a short distance from each side of top 34. Sidewalls 35 have a greater width than flanges 15 on support bracket 11, extending greater than one half the distance between face 39 of support bracket 31 and the rearward edge of top 34. Sidewalls 35 and flanges 38 are designed to form a duct on the sides of support bracket 31 for a ventilation fan 36 (FIG. 4).

Figure 6:
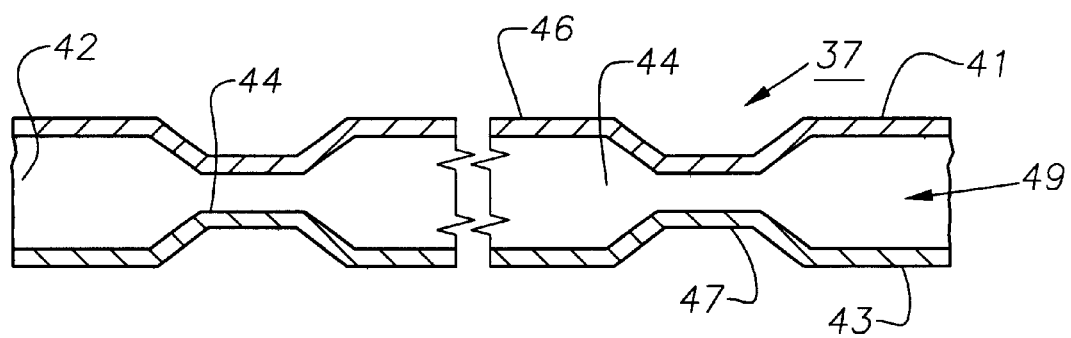
FIG. 6 is a sectional front view of a guide member used in each of the embodiments shown in FIGS. 2–5.

As shown in FIGS. 2 and 6, support bracket 31 also has a plurality of parallel U-channels or guide members 37 which are integrally formed with sheet metal body 33 along vertical face 39. Each guide member 37 has upper and lower rails 41, 43 which have two narrower portions or interstices 47 to define a variable width slot 44 between them. The width of slot 44 is greater on each end 45 and along its mid-portion 46 than at the pair of interstices 47. A base 42 joins rails 41, 43 on the rearward side of each guide member 37. Ends 45 form receptacles 49 for receiving a PCI card 65 (FIG. 4) which slides into guide member 37 in a direction parallel to guide member 37. Once installed, the PCI card extends across the entire width of slot 44. Interstices 47 of rails 41, 43 are separated by a distance which is approximately equal to a thickness of one of the PCI cards. It is permissible for rails 41, 43 to be formed from the sheet metal of body 33 since the portions of the PCI cards which come into contact with support bracket 31 are electrically insulated by a plastic card extender 67 (FIG. 4) on one end which is received by receptacle 49 (FIG. 3) and slides between rails 41, 43. Card extenders 67 electrically insulate PCI cards 65 from the sheet metal guide members 37.

Figure 4:
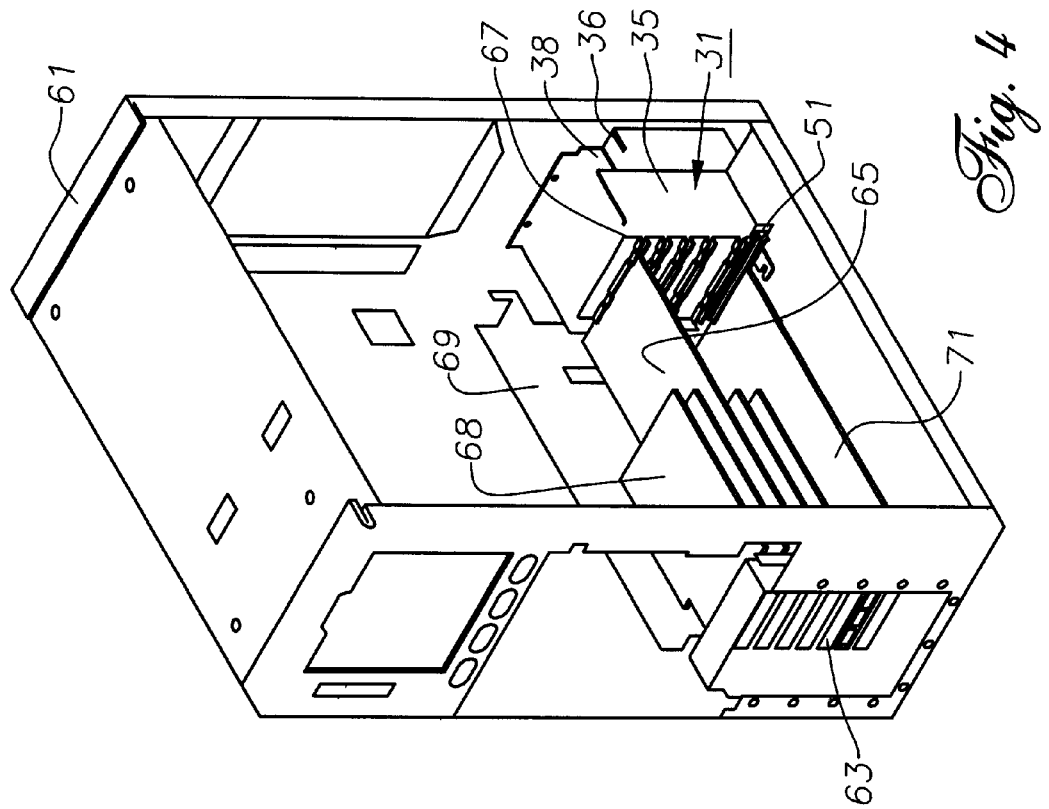
FIG. 4 is an isometric view of the PCI card support bracket of FIG. 2 shown installed in a machine frame.

Support bracket 31 also has an insulated support member 51 located near the bottom of vertical portion 39 for receiving an FSIOA card 71 (FIG. 4). Support member 51 is identical to guide members 17 and 27, described above, and mounted to vertical portion 39 in the same manner. Since FSIOA card 71 has plated through-holes (not shown) where it attaches to support bracket 31, support member 51 must be formed from plastic or other insulating materials to electrically protect card 71 from shorting out. An open aperture 53 is located between each adjacent pair of guide members 37 for permitting air flow to circulate around the PCI cards. With the same number of guide members 37 as in FIG. 1, apertures 53 provide a 55.4% open face on vertical portion 39. Each aperture 53 has an area which is larger than a frontal surface area of each guide member 37. This is due to guide members being integrally formed from the same sheet metal as body 33 and the larger openings between adjacent guide members 37 created by interstices 47.

In operation (FIG. 4), support bracket 31 is rigidly mounted to the machine frame or chassis 61 of a computer at one end such that each guide member 37 aligns with a slot 63 located at the opposite end of chassis 61. A ventilation fan 36 is located between chassis 61, the rear edges of sidewalls 35 and the lower edges of flanges 38. Thus, the flow of air created by ventilation fan 36 will be directed through support bracket 31 rather than around it. Each paired guide member 37 and slot 63 will hold and restrain one PCI card 65. Each PCI card 65 inserts edge-wise into a receptacle 49 and slides between its rails 41, 43. As stated above, PCI cards 65 are electrically insulated from the sheet metal guide members 37. When properly installed, PCI card 65 is held tautly between rails 41, 43 by interstices 47. The opposite ends of PCI cards 65 are fastened to and electrically insulated from chassis 61 at the corresponding slot 63. Shorter PCI cards, such as card 68 in FIG. 4, are restrained at a slot 63 and a connector on a motherboard 69. Cards 68 do not engage support bracket 31.

Guide member 51 is provided for supporting an FSIOA card such as card 71 in FIG. 4. Since FSIOA card 71 has plated through-holes (not shown) where it attaches to support bracket 31, the plastic or other insulating materials used to form guide member 51 electrically insulate card 71 from shorting out. As ventilation fan 36 circulates air for cooling the components of cards 65, 68 and 71, sidewalls 35 and flanges 38 act as ductwork to direct the airflow over these cards. The large openings or apertures 53 (FIG. 2) allow greater volumes of air to cool the cards that prior art support bracket 11.

Figure 3:
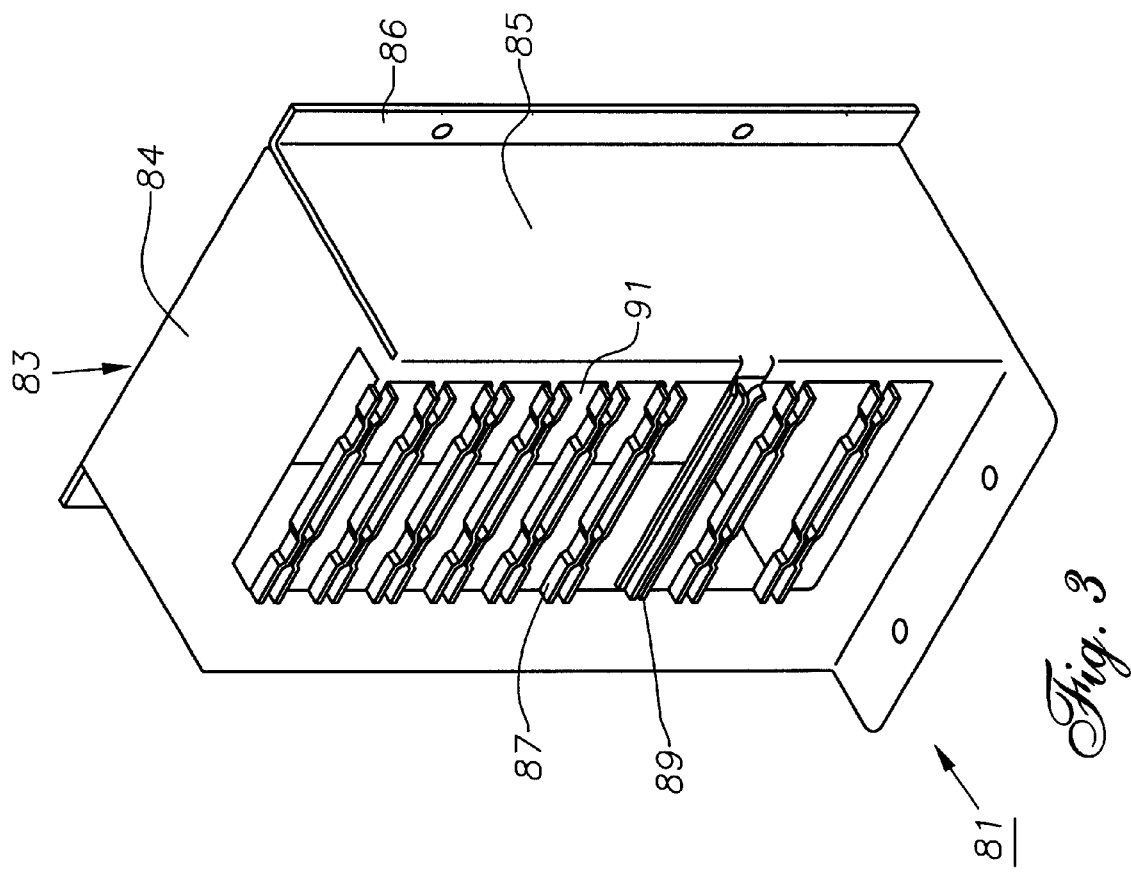
FIG. 3 is an isometric view of a second embodiment of the PCI card support bracket of FIG. 2.

A second embodiment of the invention, PCI card guide support bracket 81, is shown in FIG. 3. Support bracket 81 is very similar to support bracket 31 and has a sheet metal body 83 with a top 84 and two sidewalls 85. Sidewalls 85 extend the full distance to the rearward edge of top 84. Each sidewall 85 has an external flange 86 on its rearward edge. Support bracket 31 also has a plurality of parallel guide members 87 which are identical to guide members 37. An FSIOA guide member 89 is identical to guide member 39 and is located near the bottom of support bracket 81. An aperture 91 is located between each adjacent pair of guide members 87 and 89 for permitting air flow to circulate around the cards. Since guide members 87 are integrally formed with body 83 and interstices 91 create larger openings between adjacent guide members 87, the area of each aperture 91 is greater than the area of each guide member 87. Thus, like support bracket 31, support bracket 81 permits much greater airflow than support bracket 11.

Figure 5:
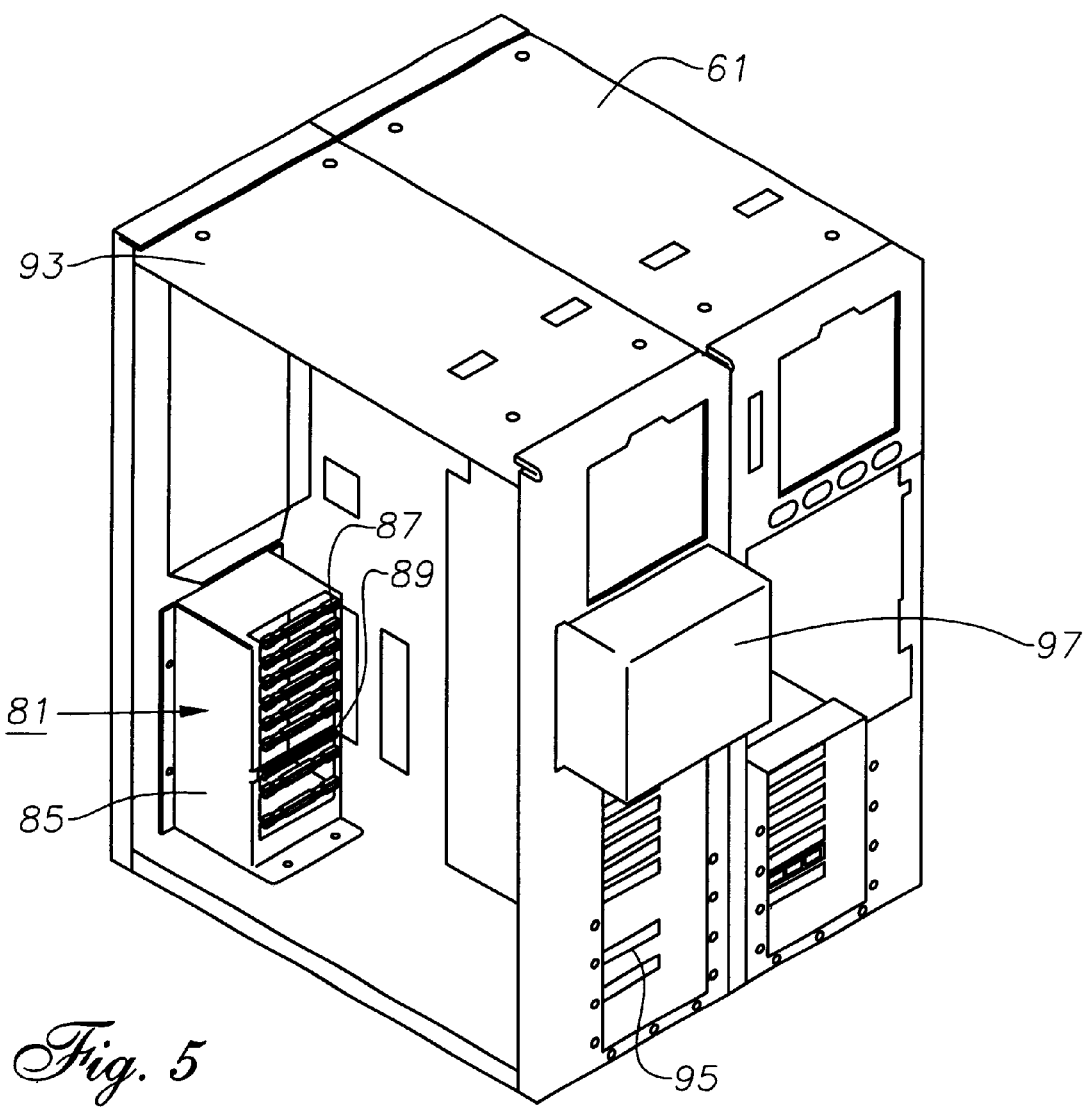
FIG. 5 is a reverse isometric view of a third embodiment of the PCI card support bracket of FIG. 2 shown installed in a expansion frame for the machine frame of FIG. 4.

In operation (FIG. 5), support bracket 81 is rigidly mounted with flanges 86 to the chassis 93 of a boxcar or expansion frame for the computer chassis 61. Sidewalls 85 extend to the walls of chassis 93. Chassis 93 has an aperture (not shown) on the rear side of support bracket 81 for admitting outside air. Each guide member 87 aligns with a slot 95 located at the opposite end of chassis 93. A ventilation fan 97 is mounted to an exterior surface of chassis 93 on an opposite side from support bracket 81 to exhaust air from chassis 93. Each paired guide member 87 and slot 95 will hold and restrain one PCI card (not shown). As described above, the PCI cards have insulating card extenders on one end which are received by the guide members 87. The opposite ends of the PCI cards are fastened to chassis 93 at the corresponding slot 95. Guide member 89 supports an FSIOA card (not shown) in the same manner as guide member 51. As ventilation fan 97 circulates air for cooling the components of the cards, the airflow moves through apertures 91 and over the cards.

The invention has several advantages. Each of the brackets disclosed comprises a single piece of stamped sheet metal which may be manufactured at a lower cost than the prior art design. The brackets also allow for better air flow since the channels have a lower profile than their predecessors.

While the invention has been shown or described in only some of its forms, it should be apparent to those skilled in the art that it is not so limited, but is susceptible to various changes without departing from the scope of the invention.

I claim:

1. A support bracket for electronic cards in a computer, comprising:
   a body formed from sheet metal and having a face and a top with a rearward edge and at least one sidewall having a width which is greater than one-half of a distance from the face to the rearward edge for directing the flow of air through the body, the body being adapted to be mounted within a chassis of the computer;
   a plurality of sheet metal guide members integrally formed with the body across its face, each of the guide members being parallel to one another and having a generally U-shaped configuration in cross-section with a pair of rails protruding therefrom, and wherein a slot is defined between the rails which is adapted to receive an edge of one of the cards; and
   an aperture in the face of the body located between each pair of adjacent ones of the guide members for permitting airflow to the cards, each of the apertures having an area which is larger than a frontal area of each of the guide members.

2. The support bracket of claim 1 wherein the slot between the rails of each of the guide members has a variable width.

3. The support bracket of claim 1, further comprising an electrically insulated support member mounted to the face of the body which is adapted to receive an electrically conductive edge of one of the cards.

4. The support bracket of claim 1 wherein the sidewall has a width which is equal to a width of the top.

5. The support bracket of claim 1 wherein the rails of each of the guide members are deflected toward each other in at least two places to define at least two places having a narrower slot width than in remaining portions of the guide member.

6. A computer, comprising:
   a chassis;
   a plurality of electronic cards;
   a support bracket for supporting the electronic cards; the support bracket comprising:
      a body mounted to the chassis, the body being formed from sheet metal and having a top and a face and at lease one sidewall extending perpendicular from the face, the sidewall having a width which is greater than one-half of a distance from the face to a rearward edge of the top for directing a flow of air through the body;
      a plurality of sheet metal guide members integrally formed with the body across its face, each of the guide members being parallel to one another and having a generally U-shaped configuration in cross-section with a pair of rails protruding perpendicularly therefrom;

each pair of rails defining a slot which receives an edge of one of the cards, each of the slots having a width which varies along its length; and an aperture in the face of the body located between each pair of adjacent ones of the guide members for permitting airflow to the cards.

7. The computer of claim 6 wherein the support bracket further comprises an electrically insulated support member mounted to the face of the body, the support member receiving an electrically conductive edge of one of the cards.

8. The computer of claim 7, further comprising a ventilation fan housing mounted to the chassis; and wherein the sidewall has a rearward edge which contacts the ventilation fan housing to form a duct.

9. The computer of claim 6 wherein the rails of each of the guide members are deflected toward each other in at least two places to define at least two places having a narrower slot width than in remaining portions of the guide member.

10. The computer of claim 6 wherein each of the apertures has an area which is larger than a frontal area of each of the guide members.

11. A support bracket for electronic cards in a computer having a chassis and a ventilation fan mounted to the chassis, comprising:

a body formed from sheet metal and having a face and a top, the body being adapted to be mounted to the chassis of the computer;

a plurality of sheet metal guide members integrally formed with the body across its face, each of the guide members being parallel to one another and having a pair of rails;

a slot extending between the rails of each of the guide members, each of the slots having a width which varies along its length, and each of the slots being adapted to receive an edge of one of the cards;

an aperture in the face of the body located between each pair of adjacent ones of the guide members for permitting airflow to the cards, each of the apertures having an area which is larger than a frontal area of each of the guide members;

an electrically insulated support member mounted to the face of the body, the support member being adapted to receive an electrically conductive edge of one of the cards; and at least one sidewall extending perpendicularly from the face, the sidewall having a width which is greater than one half of a distance from the face to a rearward edge of the top for directing the flow of air through the apertures.

12. The support bracket of claim 10 wherein the rails of each of the guide members are deflected toward each other in at least two places to define at least two places having a narrower slot width than in remaining portions of the guide member.

13. The support bracket of claim 10 wherein the guide members have a generally U-shaped configuration in cross-section.

\* \* \* \* \*